(12) United States Patent
Hashimoto et al.

(10) Patent No.: US 10,323,976 B2
(45) Date of Patent: Jun. 18, 2019

(54) LIQUID LEVEL DETECTION DEVICE

(71) Applicant: DENSO CORPORATION, Kariya, Aichi-pref. (JP)

(72) Inventors: Hiroshi Hashimoto, Kariya (JP); Isao Miyagawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 116 days.

(21) Appl. No.: 15/524,652

(22) PCT Filed: Nov. 23, 2015

(86) PCT No.: PCT/JP2015/005814
§ 371 (c)(1),
(2) Date: May 5, 2017

(87) PCT Pub. No.: WO2016/088324
PCT Pub. Date: Jun. 9, 2016

(65) Prior Publication Data
US 2017/0322066 A1   Nov. 9, 2017

(30) Foreign Application Priority Data

Dec. 4, 2014 (JP) ................................. 2014-246212

(51) Int. Cl.
*G01F 23/36* (2006.01)
*G01F 23/38* (2006.01)

(52) U.S. Cl.
CPC .............. *G01F 23/36* (2013.01); *G01F 23/38* (2013.01)

(58) Field of Classification Search
CPC .......... G01F 23/30; G01F 23/32; G01F 23/34; G01F 23/36; G01F 23/38
(Continued)

(56) References Cited

U.S. PATENT DOCUMENTS

2006/0042378 A1*  3/2006  Tanaka ................... B60K 15/03
                                                        73/305
2012/0111108 A1*  5/2012  Hashimoto ........... G01F 23/363
                                                        73/317

(Continued)

FOREIGN PATENT DOCUMENTS

JP    H09152369 A    6/1997
JP    2006226843 A   8/2006

(Continued)

*Primary Examiner* — Benjamin R Schmitt
(74) *Attorney, Agent, or Firm* — Harness, Dickey & Pierce, P.L.C.

(57) ABSTRACT

A liquid level detection device is provided with a fixed body and a rotating body, having a float and an arm. The arm has an insertion portion inserted in the rotating body and an extending portion extending straight and bent relative to the insertion portion. The rotating body has an insertion hole in which the insertion portion is inserted, a holding portion having a receiving opening receiving the extending portion and holding the extending portion received by the receiving opening, and a stopper releasing the receiving opening from a blocking state in which a blocking portion blocks the receiving opening. The stopper has a sliding surface portion on which the extending portion is allowed to slide. A thickness of the blocking portion at a tip end of the sliding surface portion is greater than a diameter of the extending portion.

5 Claims, 6 Drawing Sheets

(58) Field of Classification Search
USPC .......................................... 73/305, 314, 317
See application file for complete search history.

(56) References Cited

U.S. PATENT DOCUMENTS

2015/0355013 A1* 12/2015 Sato ...................... G01F 23/363
                                                                                                    73/317
2017/0322065 A1* 11/2017 Hashimoto ............. G01F 23/38

FOREIGN PATENT DOCUMENTS

| JP | 2009058248 A | 3/2009 |
|----|--------------|--------|
| JP | 2012225897 A | 11/2012 |

\* cited by examiner

LIQUID LEVEL DETECTION DEVICE

CROSS REFERENCE TO RELATED APPLICATIONS

This application is a U.S. National Phase Application under 35 U.S.C. 371 of International Application No. PCT/JP2015/005814 filed on Nov. 23, 2015 and published in Japanese as WO 2016/088324 A1 on Jun. 9, 2016. This application is based on and claims the benefit of priority from Japanese Patent Application No. 2014-246212 filed on Dec. 4, 2014. The entire disclosures of all of the above applications are incorporated herein by reference.

TECHNICAL FIELD

The present disclosure relates to a liquid level detection device detecting a liquid level of a liquid stored in a container.

BACKGROUND ART

A liquid level detection device in the related art which detects a liquid level of a liquid stored in a container is known. A liquid level detection device disclosed in, for example, Patent Literature 1 includes a fixed body fixed to a container, a rotating body rotating relative to the fixed body, a float floating in a liquid, and an arm connecting the rotating body and the float and allowing the rotating body to rotate with up and down motions of the float. The rotating body has an insertion hole in which an insertion portion of the arm is inserted in an insertion direction and a holding portion holding an extending portion that is received. A receiving opening receiving the extending portion is provided in an opposite direction to the insertion direction. The rotating body has a locking claw portion movable between a locking position and an unlocking position displaced from the locking position. The locking claw portion is set at the unlocking position during a mounting step of the arm by being pulled with a jig or the like in a direction to move away from a rotating-body main body and thereby forced to undergo elastic deformation.

PRIOR ART LITERATURES

Patent Literature

Patent Literature 1: JP2012-225897A

SUMMARY OF INVENTION

In the liquid level detection device configured as above, the locking claw portion has to be forced to undergo elastic deformation in a direction different from a traffic line of the arm during the mounting step. Hence, although the locking claw portion increases an arm holding strength, the locking claw portion deteriorates ease of mounting of the arm.

An object of the present disclosure is to provide a liquid level detection device which not only makes an arm easy to mount but also increases an arm holding strength.

According to an aspect of the present disclosure, the liquid level detection device is provided with a fixed body fixed to a container and a rotating body rotating relative to the fixed body, and detects a liquid level of a liquid stored in the container using a relative angle of the rotating body relative to the fixed body. The liquid level detection device includes a float floating in the liquid, and an arm connecting the float and the rotating body and allowing the rotating body to rotate with up and down motions of the float. The arm has an insertion portion to be inserted in the rotating body and an extending portion extending straight and bent relative to the insertion portion. The rotating body has an insertion hole in which the insertion portion is inserted in an insertion direction, a holding portion having a receiving opening receiving the extending portion in an intersecting direction intersecting with the insertion direction and holding the extending portion received by the receiving opening, and a stopper releasing the receiving opening by moving in the insertion direction due to elastic deformation from a blocking state in which a blocking portion blocks the receiving opening. The stopper has a sliding surface portion facing an opposite direction to the insertion direction, on which the extending portion is allowed to slide. A thickness of the blocking portion in the insertion direction at a tip end of the sliding surface portion is greater than a diameter of the extending portion.

According to the liquid level detection device, when the insertion portion of the arm is inserted into the insertion hole in the insertion direction to mount the arm, by pressing the extending portion moving in the insertion direction against the sliding surface portion facing the opposite direction to the insertion direction, the stopper is forced to undergo elastic deformation and starts to move in the insertion direction. After being pressed against the sliding surface portion, the extending portion is slid toward the receiving openings about the insertion hole as the shaft. The stopper is thus moved further in the insertion direction while the sliding surface portion is pressed by the extending portion. Accordingly, the receiving openings are released and the extending portion can be easily mounted to the holding portion. Owing to the configuration as above, a method of mounting the arm easily while moving the stopper can be adopted even when the thickness of the blocking portion in the insertion direction is greater than the diameter of the extending portion.

In cases where the extending portion nearly comes off the holding portion due to various factors, such as an external force, the blocking portion blocking the receiving openings restricts the extending portion from coming off. Because the thickness of the blocking portion in the insertion direction is greater than the diameter of the extending portion, the extending portion hardly comes off. According to the configuration as above, the liquid level detection device which not only makes the arm easy to mount but also increases a holding strength for the arm can be provided.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Figure 1:
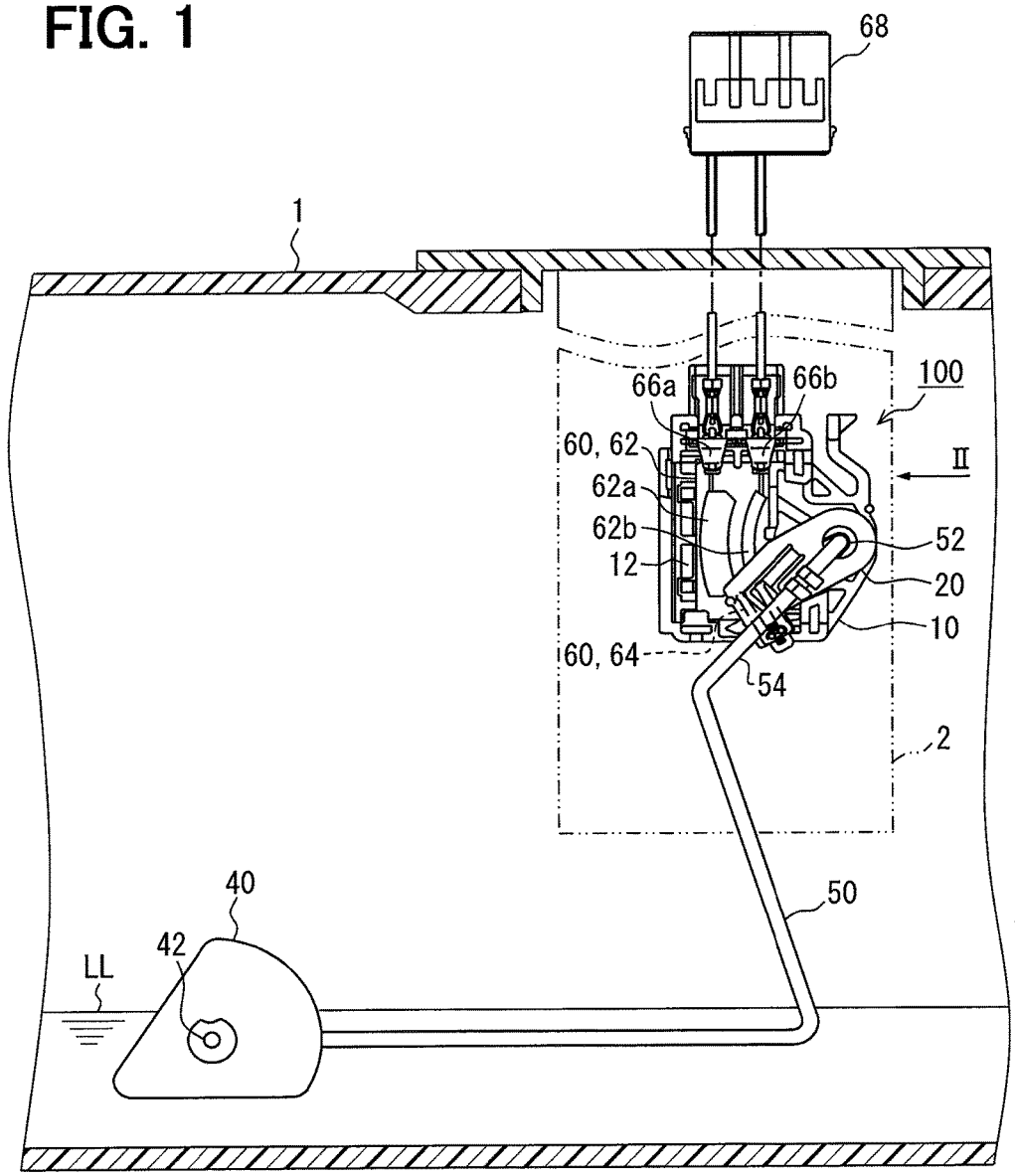
FIG. 1 is a front view of a liquid level detection device of a first embodiment.

Hereinafter, embodiments of the present disclosure will be described according to the drawings. In respective embodiments below, corresponding components are labeled with same reference numerals and a description may not be repeated where appropriate. In a case where only a part of a configuration is described in the respective embodiments, a configuration of any other embodiment described earlier can be applied to a rest of the configuration. Besides a combination of configurations explicitly described in the respective embodiments, configurations of two or more embodiments can be combined partially without an explicit description unless a trouble arises from such a combination.

First Embodiment

As is shown in FIG. 1, a liquid level detection device 100 according to a first embodiment of the present disclosure is set in a fuel tank 1 in a vehicle as a container in which fuel as a liquid is stored and held by a fuel pump module 2 or the like. The liquid level detection device 100 includes a housing 10 as a fixed body fixed to the fuel tank 1, an insulator 20 as a rotating body rotating relative to the housing 10, a float 40, an arm 50, a circuit board 62, and a sliding plate 64. The liquid level detection device 100 detects a liquid level LL of the fuel stored in the fuel tank 1 using a relative angle of the insulator 20 relative to the housing 10 detected by a variable resistor 60 chiefly formed of the circuit board 62 and the sliding plate 64 and functioning as a detection mechanism.

Figure 2:
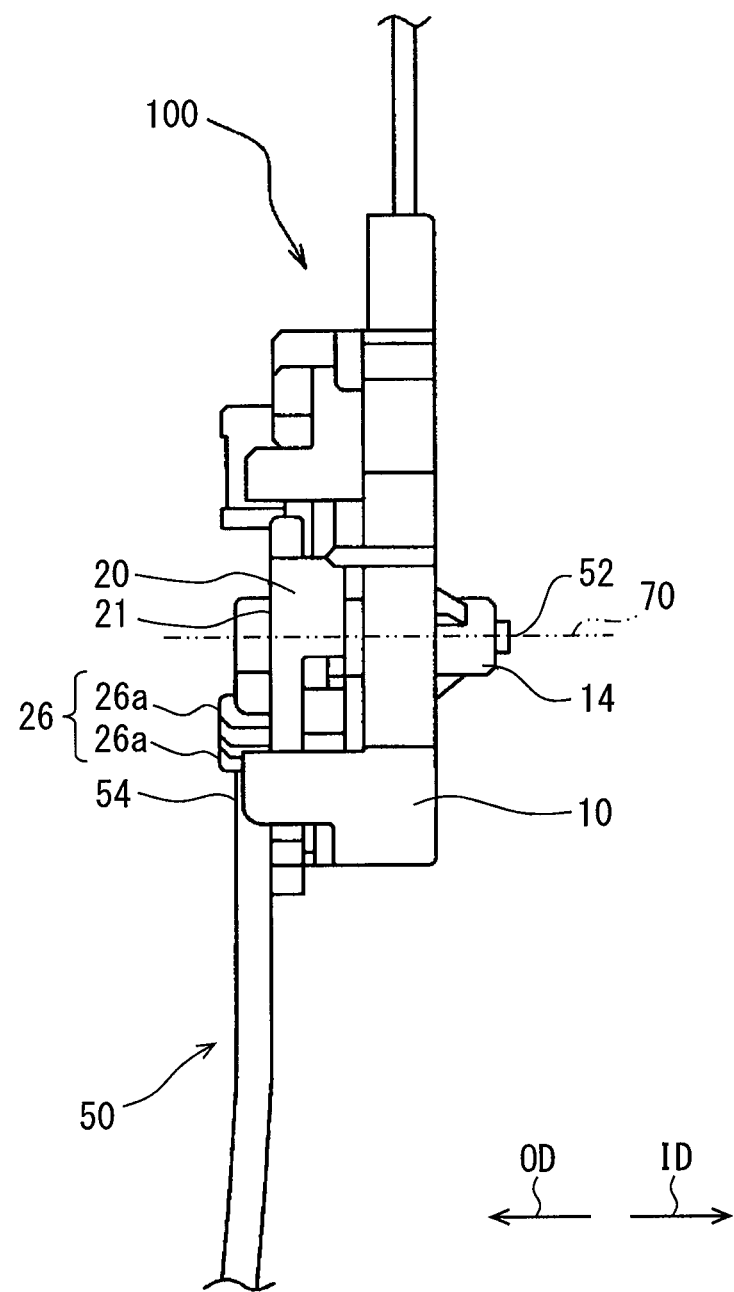
FIG. 2 is a side view of the liquid level detection device when viewed in a direction II of FIG. 1.

The housing 10 is made of synthetic resin, for example, polyacetal (POM) resin, and as are shown in FIGS. 1 and 2, fixed to the fuel tank 1 via the fuel pump module 2. The circuit board 62 and a plus terminal 66a and a minus terminal 66b connected to the circuit board 62 are attached to the housing 10. The housing 10 is shaped like a container having a bottom wall and a side wall and forms a board storing portion 12 in which to store the circuit board 62. The housing 10 is also provided with a boss portion 14 through which to pass the arm 50.

The insulator 20 is made of synthetic resin, for example, POM resin, and as are shown in FIGS. 1 to 5, supported on the housing 10 in a rotatable manner. The sliding plate 64 is attached to the insulator 20 and also the arm 50 is mounted to the insulator 20.

The float 40 is made of a material having a lower specific gravity than fuel, for example, formed ebonite, and as is shown in FIG. 1, floats on a liquid surface of the fuel. That is to say, the float 40 moves up and down with a change of the liquid level LL. The float 40 is held by the insulator 20 via the arm 50.

The arm 50 is formed of a core shaped like a round bar and having metal, such as stainless steel, and connects the float 40 and the insulator 20. A first end of the arm 50 is inserted into a through-hole 42 provided to the float 40. A second end of the arm 50 is held by the insulator 20 using a holding mechanism 22 of the insulator 20. More specifically, on the second end, the arm 50 has an insertion portion 52 to be inserted into the insulator 20 and an extending portion 54 extending straight and bent relative to the insertion portion 52.

In the present embodiment, the second end of the arm 50 is shaped like a capital L by bending the extending portion 54 by substantially 90 degrees relative to the insertion portion 52. Also, as is shown in FIG. 2, after a tip end of the insertion portion 52 is passed through the insulator 20, the tip end is inserted into the boss portion 14 of the housing 10 and forms a rotation shaft 70 of the insulator 20.

According to the configuration as above, the arm 50 rotates the insulator 20 with up and down motions of the float 40.

As is shown in FIG. 1, the circuit board 62 made of ceramics or the like is shaped like a plate and held by the housing 10 while being stored in the board storing portion 12. A set of resistive element patterns 62a and 62b as a detection circuit is provided to the circuit board 62 on a surface on a side of the insulator 20. Each of the resistive element patterns 62a and 62b is shaped like an arc about the rotation shaft 70. The resistive element pattern 62a on an outer peripheral side is formed by aligning multiple resistive elements having a predetermined electrical resistance value. The resistive element pattern 62a is an electrode pattern forming a plus pole and electrically connected to the plus terminal 66a. The resistive element pattern 62b on an inner peripheral side is an electrode pattern forming a minus pole and electrically connected to the minus terminal 66b. Accordingly, ground potential is applied to the resistive element pattern 62b via a connector 68.

Figure 4:
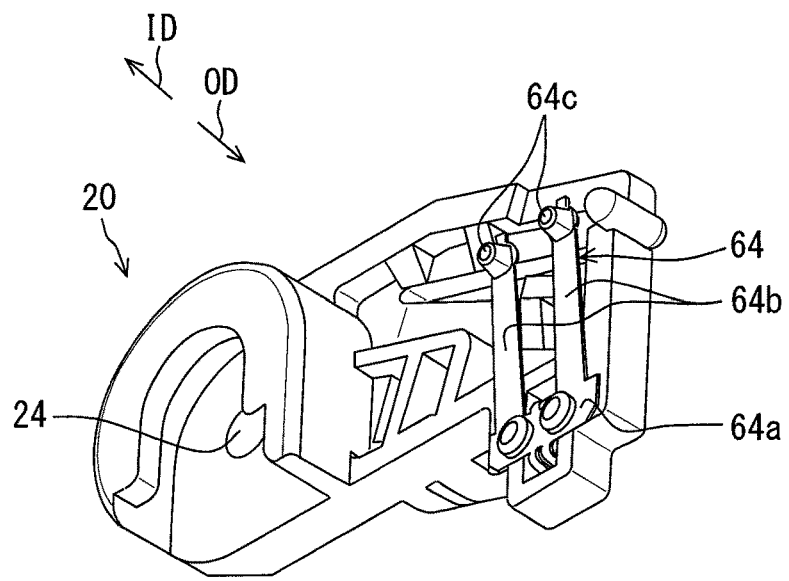
FIG. 4 is a perspective view of the insulator and a sliding plate of the first embodiment.
Figure 5:
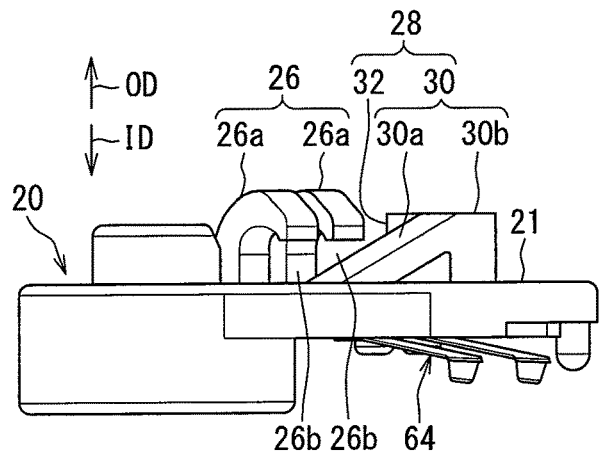
FIG. 5 is a view of the insulator when viewed in an arrow direction V of FIG. 3.

As is shown in FIG. 4, the sliding plate 64 is a plate-like conductive member made of metal, and attached to the insulator 20 on a side opposing the circuit board 62. The sliding plate 64 is shaped like a capital U as a whole and has a coupling portion 64a, a pair of flexible portions 64b extending from both ends of the coupling portion 64a, and a pair of sliding contact points 64c provided to tip ends of the flexible portions 64b. By attaching the coupling portion 64a to the insulator 20, the sliding plate 64 is allowed to rotate with the insulator 20 as one unit. The flexible portions 64b are capable of being bent in a plate thickness direction of the circuit board 62. The sliding contact points 64c are pressed against the resistive element patterns 62a and 62b due to elasticity of the flexible portions 64b, respectively.

The circuit board 62 and the sliding plate 64 together form the variable resistor 60 functioning as the detection mechanism. An electrical resistance value of the detection circuit varies with a relative angle of the insulator 20 relative to the housing 10. More specifically, when the insulator 20 rotates, the sliding plate 64 undergoes relative displacement relative to the circuit board 62 while the sliding contact points 64c are in contact with the resistive element patterns 62a and 62b, respectively. Consequently, the sliding contact points 64c slide on the resistive element patterns 62a and 62b, respectively. The electrical resistance value of the detection circuit decreases to a minimum when the sliding contact points 64c are in closest proximity to the terminals 66a and 66b, respectively. The electrical resistance value of the detection circuit increases gradually while the sliding contact points 64c in closest proximity to the terminals 66a and 66b move away from the terminals 66a and 66b in association with a rotation of the insulator 20. According to the principle as above, the variable resistor 60 is capable of detecting a relative angle. An outside device (for example, a combination meter) connected to the variable resistor 60 becomes capable of obtaining a potential difference between the terminals 66a and 66b corresponding to the electrical resistance value of the detection circuit as detection information of the liquid level LL.

The arm 50 held by the insulator 20 will now be described in detail. As are shown in FIGS. 3 to 6, the insulator 20 has an insertion hole 24, a holding portion 26, and a stopper 28 as members instituting the holding mechanism 22.

The insertion hole 24 is a cylindrical hole in which the insertion portion 52 of the arm 50 is inserted in an insertion direction ID. In the present embodiment in which the insertion portion 52 functions also as the rotation shaft 70, as is shown in FIG. 2 in particular, the insertion hole 24 is provided so as to penetrate through the insulator 20 and lies next to the boss portion 14 of the housing 10. A diameter of the insertion hole 24 is slightly greater than a diameter of the insertion portion 52. The insertion hole 24 is opened substantially perpendicularly to an outer surface 21 which is a surface of the insulator 20 facing an opposite side to a side where the sliding plate 64 is attached (in other words, an opposite direction OD to the insertion direction ID).

The holding portion 26 includes two holding claws 26a provided side by side along a radial direction of the insertion hole 24 on the outer surface 21. Each of the holding claws 26a protrudes from the outer surface 21 and forms a claw shape bent in an arc. Each of the holding claws 26a opposes the outer surface 21 at a tip end and therefore has a receiving opening 26b which receives the extending portion 54 of the arm 50 in an intersecting direction CD intersecting with the insertion direction ID. In the present embodiment, in particular, the receiving opening 26b is provided in the intersecting direction CD, which is a direction substantially intersecting with the insertion direction ID and running along the outer surface 21.

A minor diameter of each of the holding claws 26a is slightly smaller than a diameter DA of the extending portion 54. Accordingly, each of the holding claws 26a of the holding portion 26 in an elastically deformed state hold the extending portion 54 received by the receiving openings 26b by sticking to the extending portion 54. The holding portion 26 may include one or three or more holding claws 26a. Alternatively, a similar structure other than the claws may be used instead.

The stopper 28 is disposed so as to overlap a hole portion 21a provided next to the receiving openings 26b in the outer surface 21 of the insulator 20. The stopper 28 is formed to protrude from the outer surface 21 of the insulator 20 in an L-shape toward the extending portion 54 along a circumferential direction of the insertion hole 24. The stopper 28 releases the receiving openings 26b by moving in the insertion direction ID when a blocking portion 32 of the stopper 28 undergoes elastic deformation from a blocking state in which the blocking portion 32 blocks the receiving opening 26b. When the liquid level detection device 100 to be used in the fuel tank 1 is set as shown in FIG. 1, the stopper 28 is in the blocking state, that is, not in an elastically deformed state.

The stopper 28 has a sliding surface portion 30 facing the opposite direction OD to the insertion direction ID. The sliding surface portion 30 has a smooth surface to allow the extending portion 54 to slide on the surface during a fabrication process. The sliding surface portion 30 is provided with a sliding slope 30a and a flat tip end 30b. As is particularly shown in FIG. 5, the sliding slope 30a is provided in such a manner that the sliding slope 30a in the blocking state takes a shape of a slope which inclines in the circumferential direction of the insertion hole 24 and protrudes more in the opposite direction OD toward a tip end. In other words, the sliding slope 30a in the blocking state inclines relative to the outer surface 21. The flat tip end 30b, which is provided closer to the tip end than the sliding slope 30a, connects to the sliding slope 30a and is provided so as to incline relative to the sliding slope 30a. The flat tip end 30b in the blocking state is substantially parallel to the outer surface 21.

The blocking portion 32 is provided at the tip end of the sliding surface portion 30. The blocking portion 32 in the blocking state opposes the extending portion 54 at a point displaced from the holding portion 26 in the radial direction of the insertion hole 24. In the present embodiment, in particular, the blocking portion 32 opposes the extending portion 54 with a slight clearance in between at a point on an outer peripheral side of the holding portion 26 in the radial direction of the insertion hole 24. A thickness TS of the blocking portion 32 in the insertion direction ID is greater than the diameter DA of the extending portion 54. The blocking portion 32 is provided in such a manner that the blocking portion 32 in the blocking state overhangs the extending portion 54 held by the holding portion 26 in the opposite direction OD.

Further, the blocking portion 32 has a regulating groove 32a regulating a movement of the extending portion 54 in the opposite direction OD. As is particularly shown in FIG. 6, the regulating groove 32a of the present embodiment is provided along the extending portion 54 and formed in a shape of an arc groove in which the extending portion 54 is fit.

Figure 7:
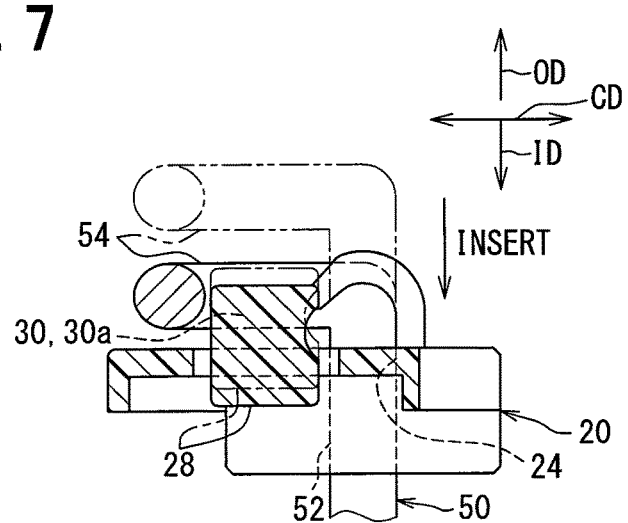
FIG. 7 is a schematic view corresponding to FIG. 6 and used to describe a step of inserting an insertion portion into an insertion hole in a fabrication process.
Figure 8:
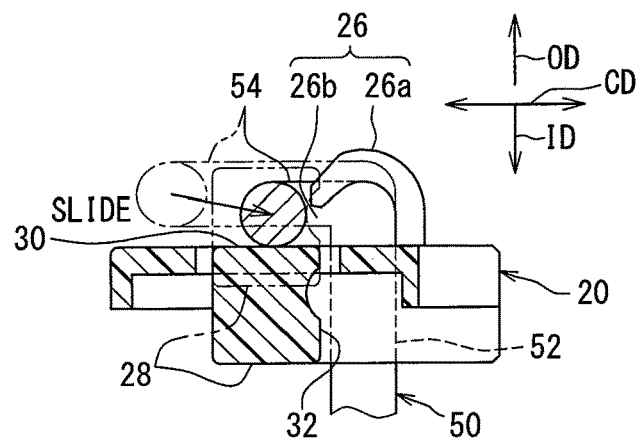
FIG. 8 is a schematic view corresponding to FIG. 6 and used to describe a release state in the fabrication process.

The fabrication process to mount the arm 50 to the insulator 20 will now be described briefly also using FIGS. 7 and 8.

Firstly, the arm 50 is set. More specifically, the insertion portion 52 is aligned with the insertion hole 24 and the extending portion 54 is disposed so as to overlap the sliding surface portion 30 of the stopper 28 in the insertion direction ID at a position displaced from the holding portion 26 in the circumferential direction of the insertion hole 24 (see alternate long and two short dashes line of FIGS. 3 and 7). Herein, it is preferable to dispose the extending portion 54 so as to overlap the sliding slope 30a of the sliding surface portion 30 in the insertion direction ID.

Subsequently, the insertion portion 52 of the arm 50 is inserted into the insertion hole 24 of the insulator 20 in the insertion direction ID. More specifically, as is shown in FIG. 7, the insertion portion 52 is inserted into the insertion hole 24 by moving the arm 50 set in the setting step in the insertion direction ID. Also, because the extending portion 54 moving in the insertion direction ID presses against the sliding slope 30a of the sliding surface portion 30, the stopper 28 in the blocking state is forced to undergo elastic deformation and eventually starts to move in the insertion direction ID.

Subsequently, the extending portion 54 is slid toward the receiving openings 26b about the insertion hole 24 as a shaft. As are shown in FIGS. 7 and 8, when the extending portion 54 slides on the sliding surface portion 30 including the sliding slope 30a protruding more in the opposite direction OD to the insertion direction ID toward the tip end, the stopper 28 undergoes elastic deformation to a greater extent due to a force applied in the insertion direction ID and moves further in the insertion direction ID. As is indicated by a solid line of FIG. 8, when the extending portion 54 reaches in front of the receiving openings 26b, the blocking portion 32 changes to a release state in which the blocking portion 32 releases the receiving openings 26b.

Figure 3:
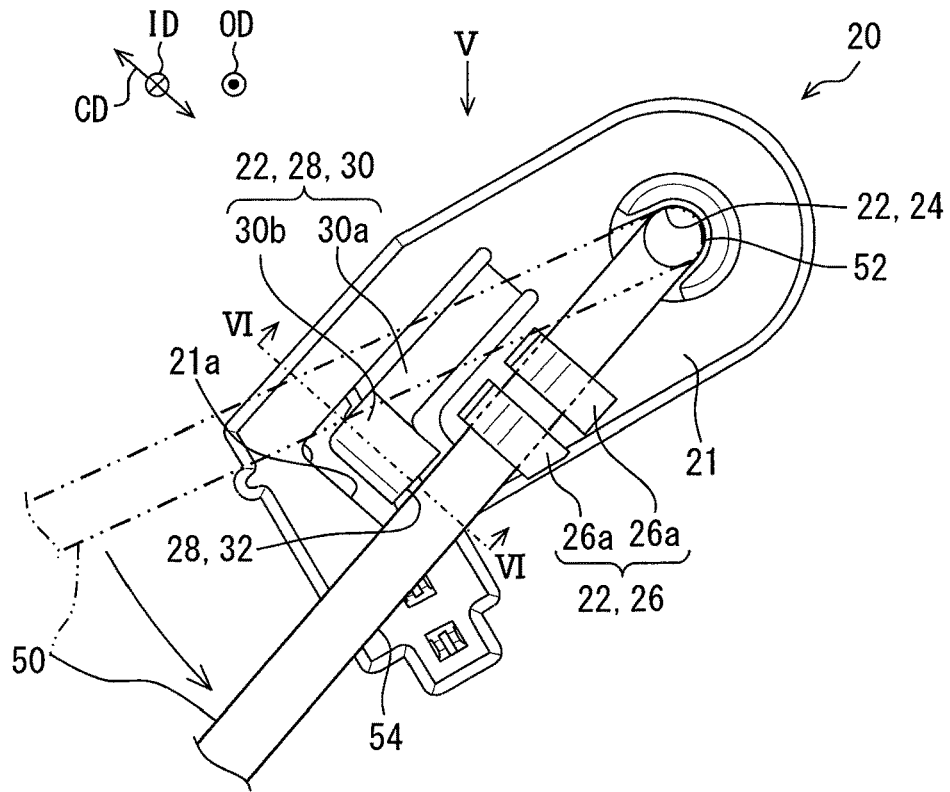
FIG. 3 is a front view of an insulator and an arm of the first embodiment.
Figure 6:
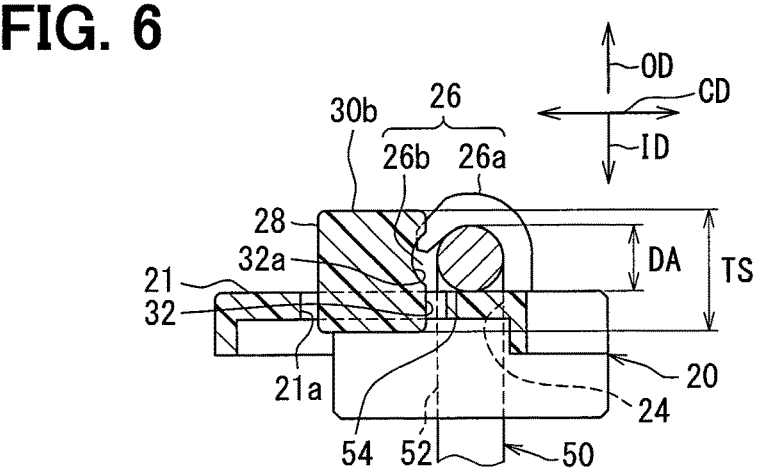
FIG. 6 is a schematic view showing a cross section taken along the line VI-VI of FIG. 3.

Subsequently, the extending portion 54 is inserted into the holding portion 26 through the receiving opening 26b. More specifically, by pushing the extending portion 54 toward the receiving openings 26b, the holding claws 26a as the holding portion 26 are forced to undergo elastic deformation and the extending portion 54 is received by the holding portion 26. The stopper 28 moves in the opposite direction OD by elastically restoring again to the blocking state in which the blocking portion 32 blocks the receiving openings 26b. In the manner as above, the arm 50 is mounted to the insulator 20 as are shown in FIGS. 3 and 6.

The following will describe an operational-effect of the first embodiment described above.

According to the first embodiment, when the insertion portion 52 of the arm 50 is inserted into the insertion hole 24 in the insertion direction ID to mount the arm 50, by pressing the extending portion 54 moving in the insertion direction ID against the sliding surface portion 30 facing the opposite direction OD to the insertion direction ID, the stopper 28 is forced to undergo elastic deformation and starts to move in the insertion direction ID. After being pressed against the sliding surface portion 30, the extending portion 54 is slid toward the receiving openings 26b about the insertion hole 24 as the shaft. The stopper 28 is thus moved further in the insertion direction ID while the sliding surface portion 30 is pressed by the extending portion 54. Accordingly, the receiving openings 26b are released and the extending portion 54 can be easily mounted to the holding portion 26. Owing to the configuration as above, a method of mounting the arm 50 easily while moving the stopper 28 can be adopted even when the thickness TS of the blocking portion 32 in the insertion direction ID is greater than the diameter DA of the extending portion 54.

In cases where the extending portion 54 nearly comes off the holding portion 26 due to various factors, such as an external force, the blocking portion 32 blocking the receiving openings 26b restricts the extending portion 54 from coming off. Because the thickness TS of the blocking portion 32 in the insertion direction ID is greater than the diameter DA of the extending portion 54, the extending portion 54 hardly comes off. According to the configuration as above, the liquid level detection device 100 which not only makes the arm 50 easy to mount but also increases a holding strength for the arm 50 can be provided.

According to the first embodiment, the blocking portion 32 is provided in such a manner that the blocking portion 32 in the blocking state overhangs the extending portion 54 held by the holding portion 26 in the opposite direction OD to the insertion direction ID. Owing to the configuration as above, in cases where the extending portion 54 nearly comes off the holding portion 26, the extending portion 54 hardly surmounts the stopper 28 in the opposite direction OD. Hence, a holding strength for the arm 50 can be increased.

According to the first embodiment, the sliding surface portion 30 is provided with the sliding slope 30a in such a manner that the sliding slope 30a in the blocking state takes a shape of a slope which protrudes more in the opposite direction OD to the insertion direction ID toward the tip end. Owing to the configuration as above, the sliding surface portion 30 is pressed by the extending portion 54 in a reliable manner when the extending portion 54 is slid on the stopper 28 toward the receiving openings 26b about the insertion hole 24 as the shaft. Hence, a method of mounting the arm 50 easily while moving the stopper 28 can be adopted.

According to the first embodiment, the extending portion 54 is formed in a shape of a round bar and the blocking portion 32 has the regulating groove 32a formed in a shape of an arc groove in which the extending portion 54 is fit and regulating a movement of the extending portion 54 in the opposite direction OD to the insertion direction ID. Owing to the configuration as above, in cases where the extending portion 54 nearly comes off the holding portion 26 and is in contact with the blocking portion 32, the extending portion 54 fits into the regulating groove 32a, in which instance the extending portion 54 can be received while a pressure applied to the stopper 28 from the extending portion 54 is dispersed. Consequently, a holding strength for the arm 50 can be increased.

Second Embodiment

Figure 9:
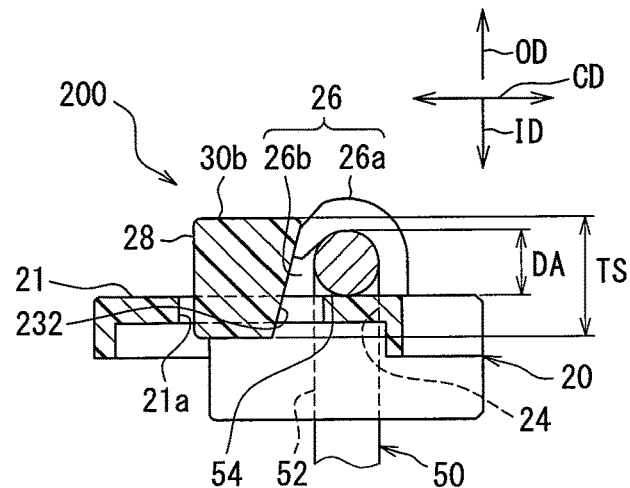
FIG. 9 is a view of a second embodiment corresponding to FIG. 6.

As is shown in FIG. 9, a second embodiment of the present disclosure is a modification of the first embodiment above. The second embodiment will be described chiefly as to a difference from the first embodiment above.

A liquid detection device 200 of the second embodiment has a blocking portion 232, and as in the first embodiment above, the blocking portion 232 in a blocking state opposes an extending portion 54 at a point displaced from the holding portion 26 in a radial direction of the insertion hole 24. A thickness TS of the blocking portion 232 in the insertion direction ID is greater than a diameter DA of the extending portion 54. The blocking portion 232 is provided in such a manner that the blocking portion 232 in the blocking state overhangs the extending portion 54 held by the holding portion 26 in an opposite direction OD to the insertion direction ID.

It should be noted, however, that the blocking portion 232 of the second embodiment is formed in a shape of a slope which protrudes more toward the holding portion 26 as headed in the opposite direction OD. The blocking portion 232 does not have a regulating groove on a surface and has a smooth plane instead.

According to the second embodiment described as above, the blocking portion 232 is formed in a shape of a slope which protrudes more toward the holding portion 26 as headed in the opposite direction OD to the insertion direction ID. Owing to the configuration as above, in cases where the extending portion 54 nearly comes off the holding portion 26 and is in contact with the blocking portion 232, the extending portion 54 hardly surmounts the stopper 28 in the opposite direction OD. Consequently, a holding strength for the arm 50 can be increased.

Other Embodiment

The present disclosure is not limited to the embodiments mentioned above, and can be applied to various embodiments which are also within the spirit and scope of the present disclosure.

Figure 10:
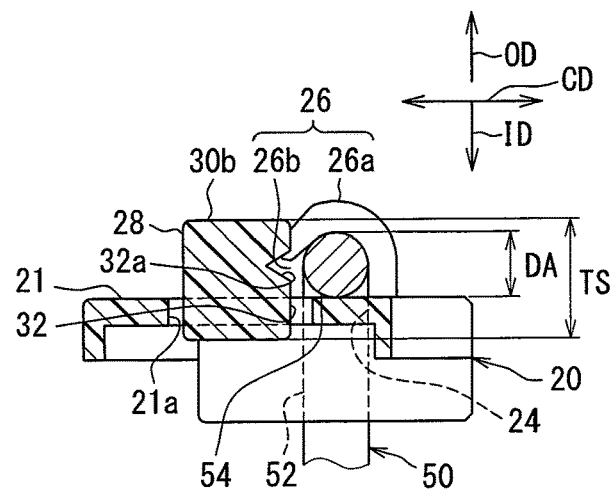
FIG. 10 is a view of one example of a first modification corresponding to FIG. 6.
Figure 11:
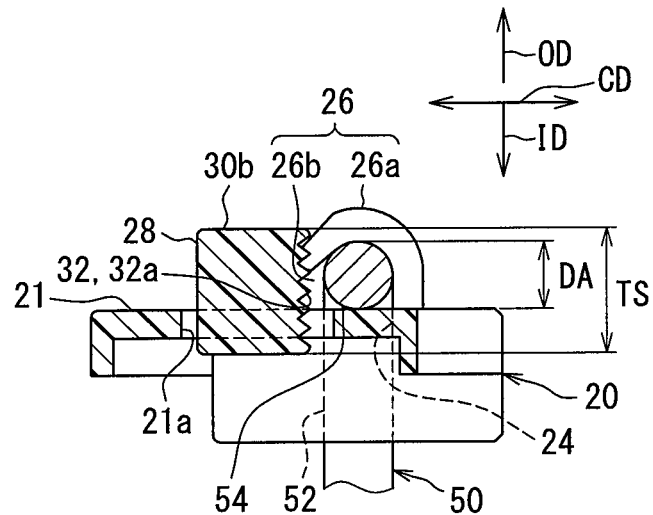
FIG. 11 is a view of another example of the first modification corresponding to FIG. 6.

More specifically, in a first modification of the first embodiment above, as is shown in FIG. 10, the regulating groove 32a may be provided along the extending portion 54 and formed in a triangular groove in which the extending portion 54 is fit. Alternatively, as is shown in FIG. 11, the regulating groove 32a may be provided in a saw-tooth shape. Further, the regulating groove 32a is not necessarily provided along the extending portion 54 and may be inclined relative to a direction in which the extending portion 54 extends.

Figure 12:
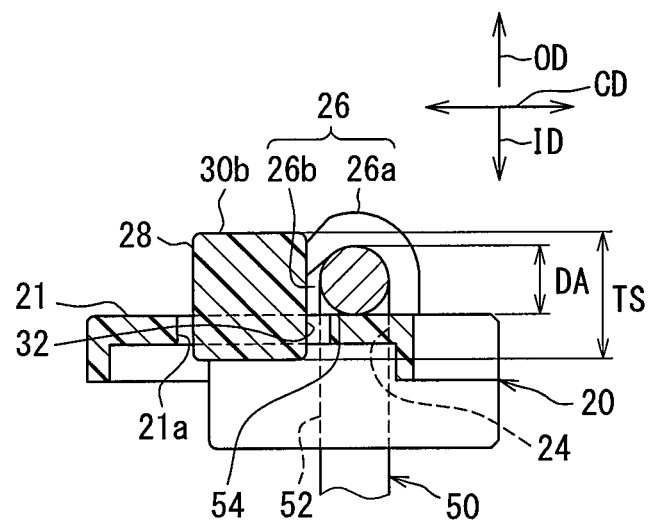
FIG. 12 is a view of a second modification corresponding to FIG. 6.

In a second modification of the first and second embodiments above, as is shown in FIG. 12, the blocking portion 32 may not be provided with a regulating groove and formed in a planar shape along an insertion direction ID.

In a third modification of the first and second embodiments above, the sliding surface portion 30 may be provided with a step, a groove, or the like to an extent that sliding of the extending portion 54 is not interfered with during a mounting step of the arm 50.

In a fourth modification of the first and second embodiments above, the variable resistor 60 functioning as a detection mechanism may adopt various other methods. For example, only one sliding contact point 64c may be provided.

In a fifth modification of the first and second embodiments above, a detection mechanism may adopt a mechanism which detects a magnetic field generated from a magnet held by a magnet holder as a rotating body using a hall IC held by a body as a fixed body.

In a sixth modification of the first and second embodiments above, the present disclosure may be applied to a liquid level detection device in a container equipped to a vehicle for other liquids, such as brake fluid, engine coolant and engine oil. Further, containers are not limited to containers equipped to a vehicle and the present disclosure is also applicable to a liquid level detection device set in a liquid container equipped to various consumer devices and various transportation devices.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A liquid level detection device provided with a fixed body fixed to a container and a rotating body rotating relative to the fixed body, and detecting a liquid level of a liquid stored in the container using a relative angle of the rotating body relative to the fixed body, comprising:

a float floating in the liquid; and an arm connecting the float and the rotating body and allowing the rotating body to rotate with up and down motions of the float, wherein the arm has an insertion portion to be inserted in the rotating body and an extending portion extending straight and bent relative to the insertion portion, the rotating body has an insertion hole in which the insertion portion is inserted in an insertion direction, a holding portion having a receiving opening receiving the extending portion in an intersecting direction intersecting with the insertion direction and holding the extending portion received by the receiving opening, and a stopper releasing the receiving opening by moving in the insertion direction due to elastic deformation from a blocking state in which a blocking portion blocks the receiving opening, the stopper has a sliding surface portion facing an opposite direction to the insertion direction, on which the extending portion is allowed to slide, and a thickness of the blocking portion in the insertion direction at a tip end of the sliding surface portion is greater than a diameter of the extending portion.

2. The liquid level detection device according to claim 1, wherein the blocking portion is provided in such a manner that the blocking portion in the blocking state overhangs the extending portion held by the holding portion in the opposite direction.

3. The liquid level detection device according to claim 1, wherein the sliding surface portion is provided with a sliding slope in such a manner that the sliding slope in the blocking state takes a shape of a slope which protrudes more in the opposite direction toward the tip end.

4. The liquid level detection device according to claim 1, wherein the extending portion is provided in a shape of a round bar, and the blocking portion has a regulating groove provided in a shape of an arc groove in which the extending portion is fit and regulating a movement of the extending portion in the opposite direction.

5. The liquid level detection device according to claim 1, wherein the blocking portion is provided in a shape of a slope which protrudes more toward the holding portion as headed in the opposite direction.

* * * * *